US010501021B2

(12) United States Patent
Livingston et al.

(10) Patent No.: US 10,501,021 B2
(45) Date of Patent: Dec. 10, 2019

(54) REAR LOADING, DROP DOWN LADDER RACK SYSTEM AND METHOD OF USE

(71) Applicant: Adrian Steel Company, Adrian, MI (US)

(72) Inventors: Nolin Miller Livingston, Napoleon, OH (US); Michael Duane Gettel, Adrian, MI (US); Mark Dankow, Blacklick, OH (US); Thomas Richter, Sand Creek, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 15/884,744

(22) Filed: Jan. 31, 2018

(65) Prior Publication Data

US 2018/0257577 A1 Sep. 13, 2018

Related U.S. Application Data

(60) Provisional application No. 62/467,851, filed on Mar. 7, 2017.

(51) Int. Cl.
*B60R 9/042* (2006.01)
*B60R 9/048* (2006.01)

(52) U.S. Cl.
CPC ............ *B60R 9/042* (2013.01); *B60R 9/0423* (2013.01); *B60R 9/0485* (2013.01)

(58) Field of Classification Search
CPC ..... B60P 3/1008; B60P 3/1016; B60P 3/1025; B60P 1/52; E06C 5/02; E06C 5/24; A62C 31/28; Y10T 292/089; Y10T 292/0917; B60R 9/0423; B60R 9/0485; B60R 2011/0028; B66F 11/04

USPC ......................................................... 414/462
See application file for complete search history.

(56) References Cited

U.S. PATENT DOCUMENTS

| | | | | |
|---|---|---|---|---|
| 1,260,560 A | * | 3/1918 | Longenecker | B60P 1/32 298/14 |
| 1,508,946 A | * | 9/1924 | Alderman | B60P 1/12 298/14 |
| 1,600,614 A | * | 9/1926 | Anthony | B60P 1/32 298/12 |
| 1,693,543 A | * | 11/1928 | Biszantz | B60P 1/12 298/14 |
| 3,128,893 A | * | 4/1964 | Jones | B60P 3/1025 414/462 |

(Continued)

OTHER PUBLICATIONS

Gentili G2000 Harrier Ladder Rack for Mercedes Sprinter. May 22, 2017, https://www.inlad.com/gentili-g2000-harrier-ladder-rack-for-mercedes-sprinter-gentili-spr.

(Continued)

*Primary Examiner* — Gregory W Adams
(74) *Attorney, Agent, or Firm* — Marshall & Melhorn, LLC

(57) ABSTRACT

One embodiment of a ladder rack system and method of use are described. The system may have a ladder rack frame with an inner rail and an outer rail. The system may also have a ladder rack bed that is selectively moveable with respect to the ladder rack frame. The ladder rack bed may have an inner beam and an outer beam. The system may also have a driveshaft and at least one driveline arm that are connected together. The driveline arm is also connected to the ladder rack bed.

27 Claims, 17 Drawing Sheets

(56) References Cited

U.S. PATENT DOCUMENTS

| | | | | |
|---|---|---|---|---|
| 3,927,779 | A * | 12/1975 | Johnson | B60P 3/1025 414/462 |
| 4,618,083 | A * | 10/1986 | Weger, Jr. | B60R 9/0485 224/309 |
| 5,058,791 | A * | 10/1991 | Henriquez | B60R 9/0423 224/310 |
| 5,297,912 | A * | 3/1994 | Levi | B60R 9/0423 414/462 |
| 5,423,650 | A * | 6/1995 | Zerbst | B60R 9/042 224/310 |
| 5,850,891 | A | 12/1998 | Olms et al. | |
| 6,092,972 | A | 7/2000 | Levi | |
| 6,105,840 | A | 8/2000 | Trevino | |
| 6,152,674 | A * | 11/2000 | Ogrodnick | B60P 1/6463 414/491 |
| 6,315,181 | B1 | 11/2001 | Bradley et al. | |
| 6,360,930 | B1 | 3/2002 | Flickenger | |
| 6,427,889 | B1 | 8/2002 | Levi | |
| 6,764,268 | B2 | 7/2004 | Levi | |
| 7,097,409 | B2 | 8/2006 | Richter | |
| 7,137,479 | B2 * | 11/2006 | Ziaylek | B60R 9/0423 182/127 |
| 8,991,889 | B1 | 3/2015 | Levi | |
| 9,132,780 | B2 | 9/2015 | Sautter, Jr. et al. | |
| 9,132,781 | B2 | 9/2015 | Thibault | |
| 9,156,411 | B2 | 10/2015 | Elezaj | |
| 9,327,654 | B2 | 5/2016 | Richter et al. | |
| 9,415,726 | B2 | 8/2016 | Levi | |
| 9,481,313 | B2 | 11/2016 | Levi | |
| 9,526,932 | B1 * | 12/2016 | Ziaylek | A62C 27/00 |
| 9,630,565 | B2 | 4/2017 | Gallagher | |
| 9,694,756 | B2 | 7/2017 | Pullman et al. | |
| 2004/0052622 | A1 * | 3/2004 | Chisnall | B60P 3/40 414/462 |
| 2006/0185933 | A1 * | 8/2006 | Thibault | B60R 9/0423 182/127 |
| 2011/0038698 | A1 * | 2/2011 | Li | B60P 3/14 414/479 |
| 2012/0263561 | A1 * | 10/2012 | Li | B60R 9/0423 414/462 |
| 2015/0048127 | A1 | 2/2015 | Sutton et al. | |
| 2015/0125245 | A1 * | 5/2015 | Gallagher | B60R 9/042 414/462 |
| 2017/0232904 | A1 | 8/2017 | Bharucha | |
| 2017/0240118 | A1 | 8/2017 | Lachance et al. | |

OTHER PUBLICATIONS

Roof Racks and Ladder Holders. May 22, 2017, https://www.syncro-system.biz/roof-racks-and-ladder-holders.

Ladder Restraint/SafeStow3-RinoProducts. May 22 2017, http://www.rhinoproducts.co.uk/product/safestow4/.

\* cited by examiner

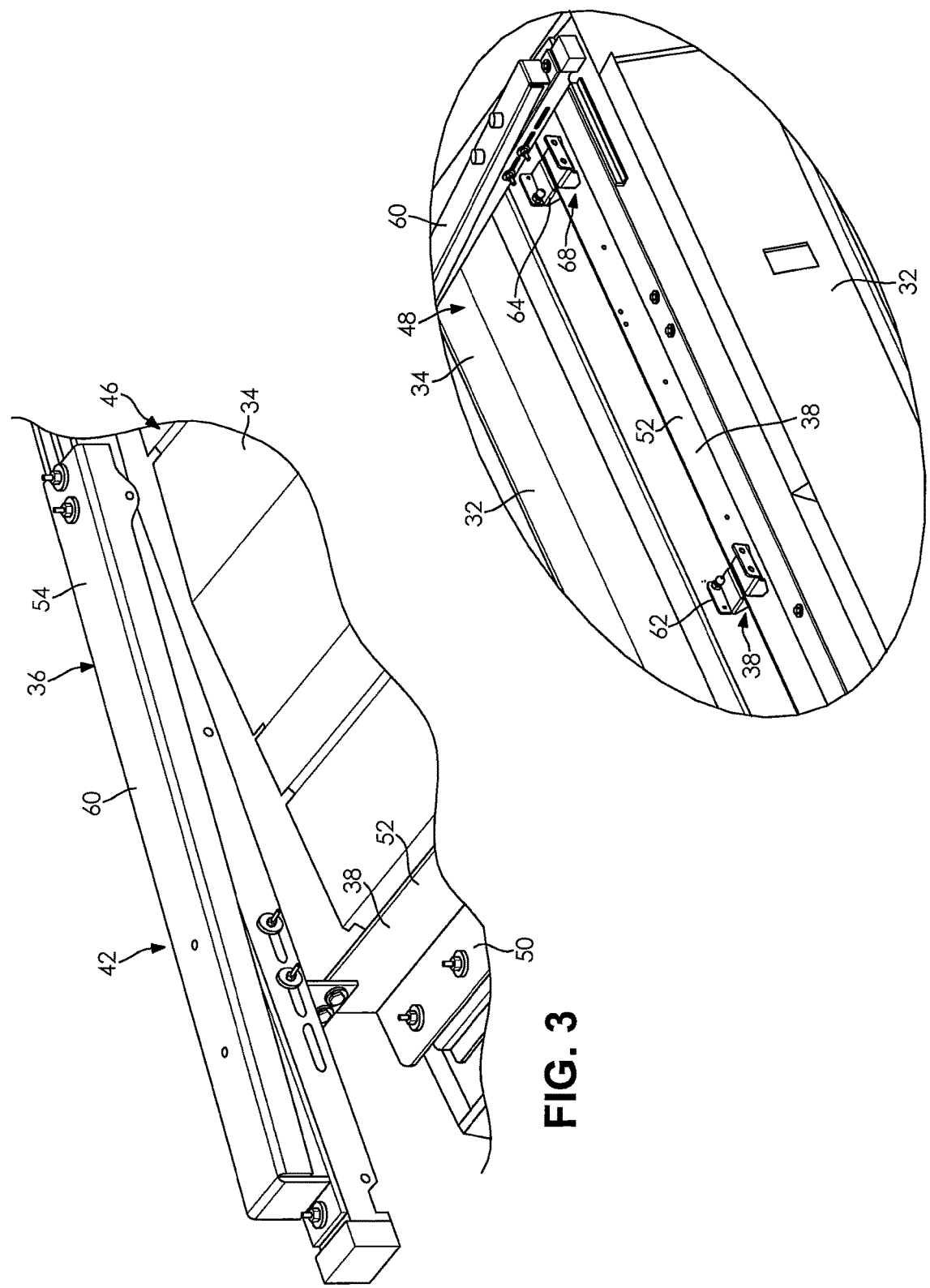

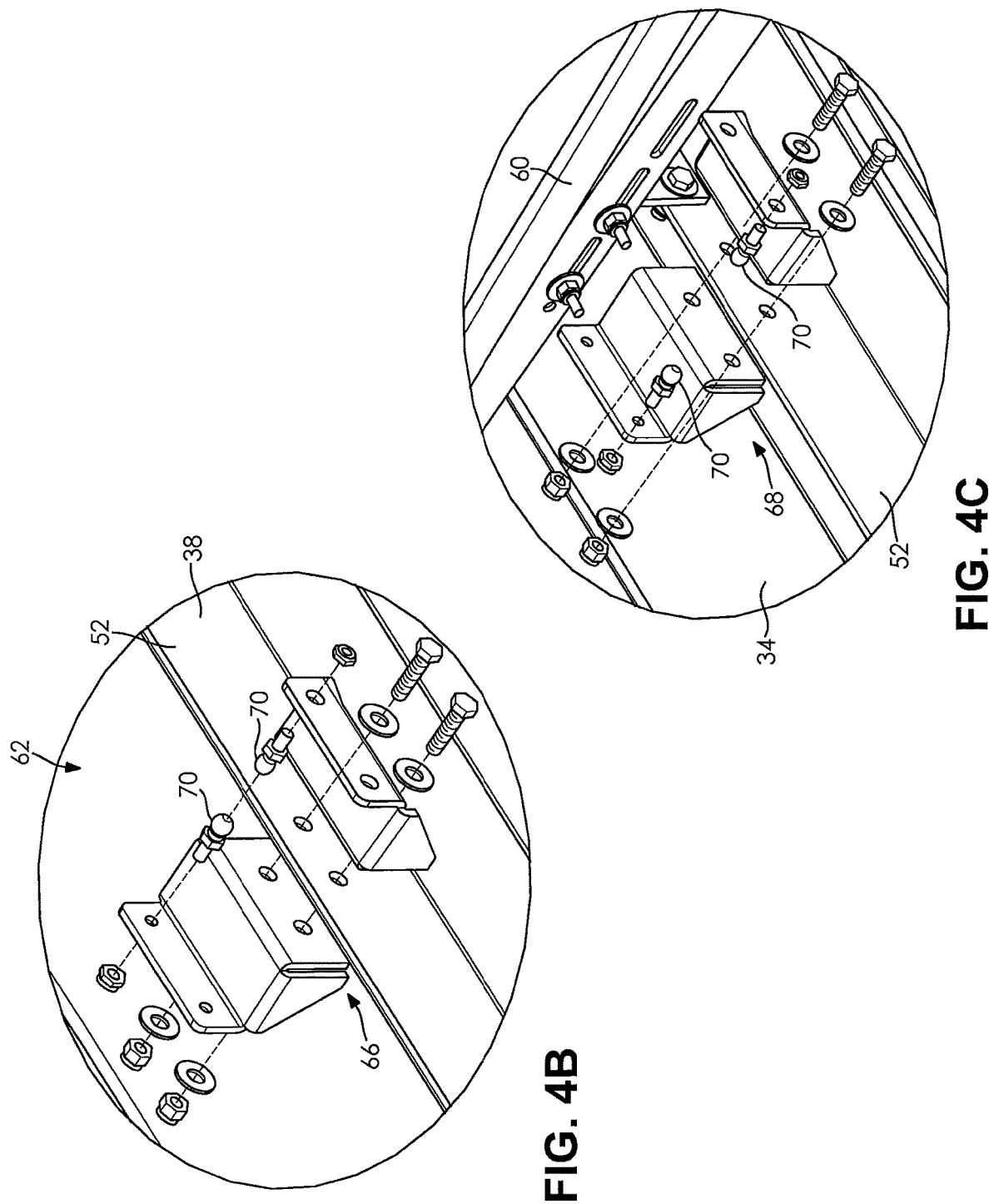

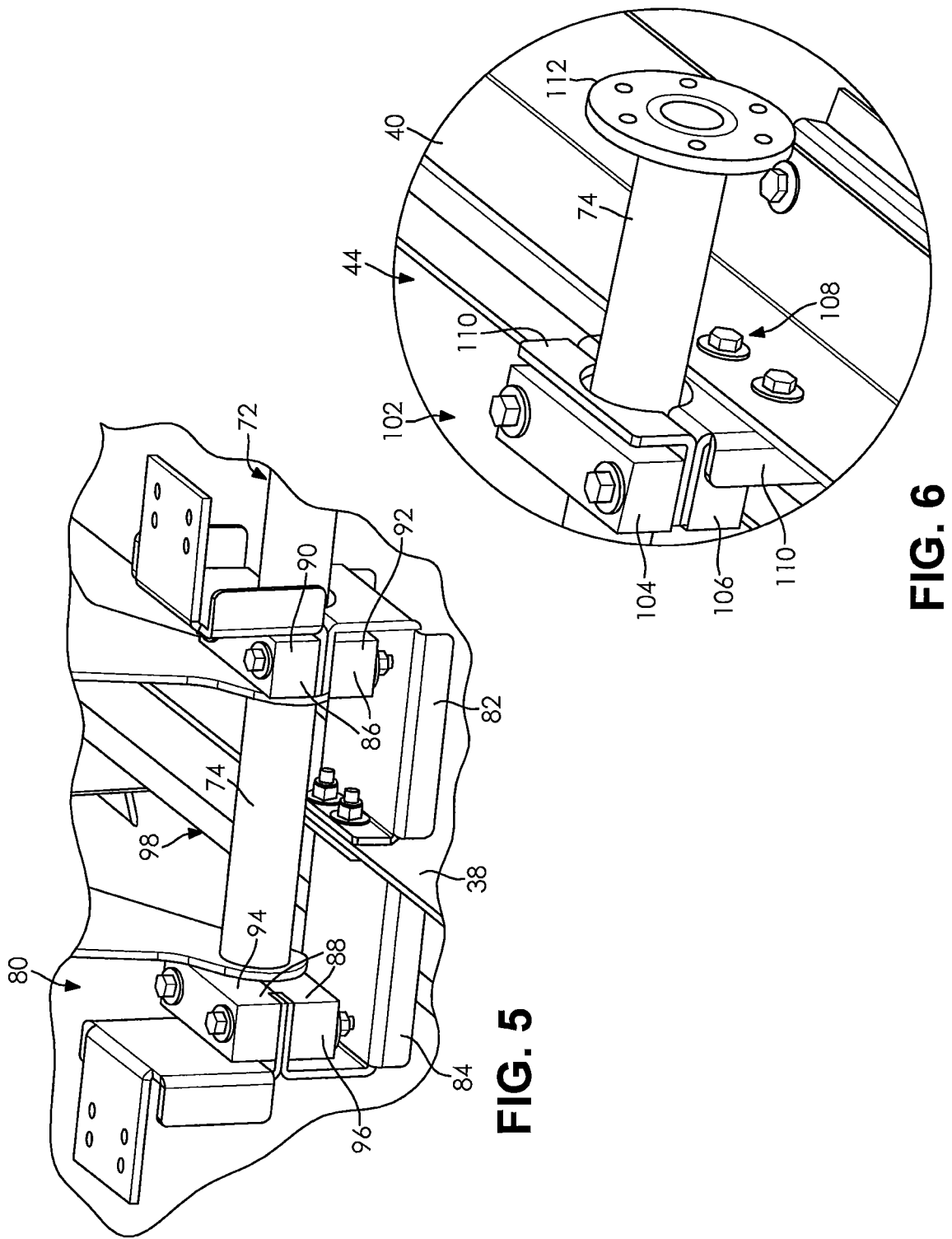

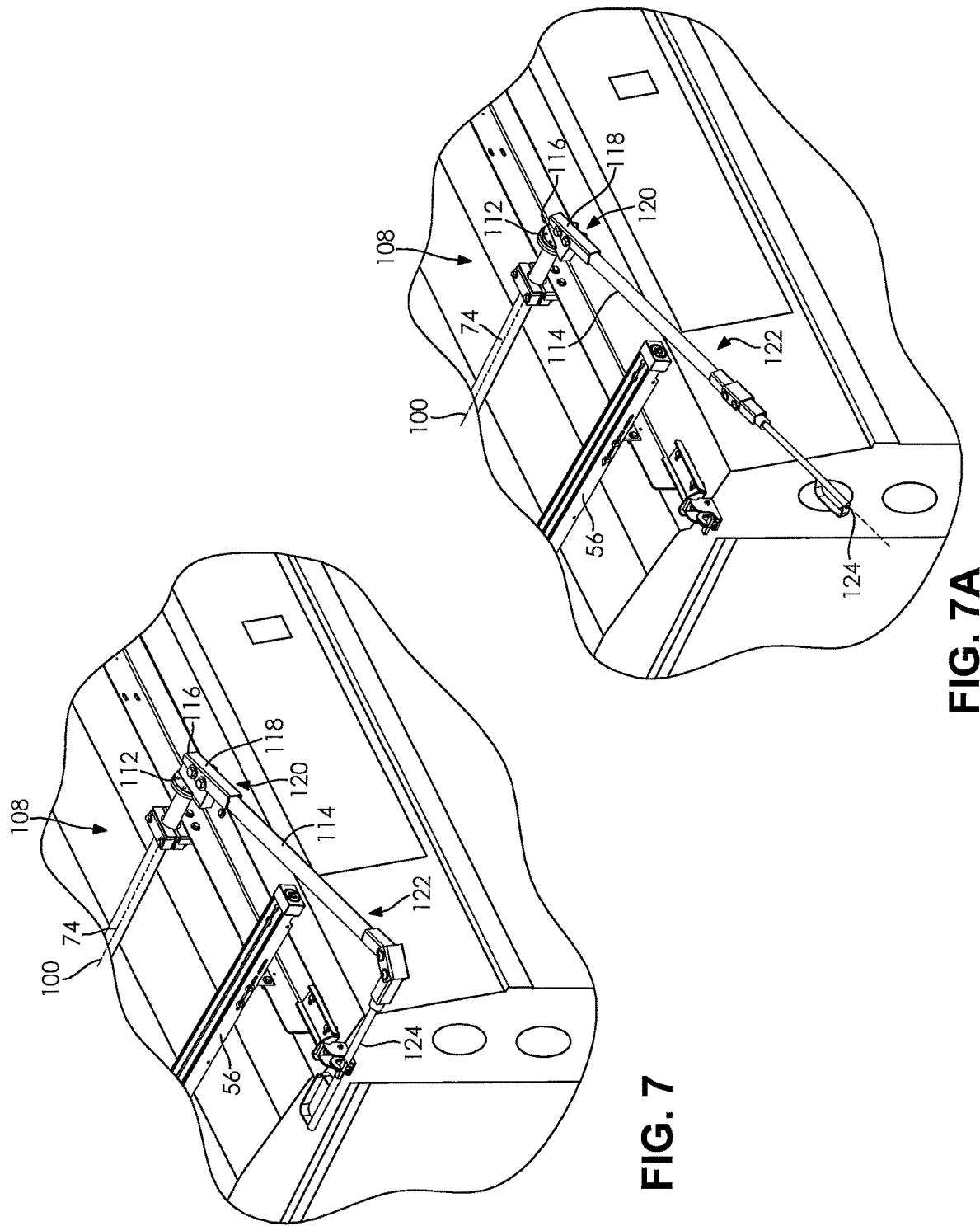

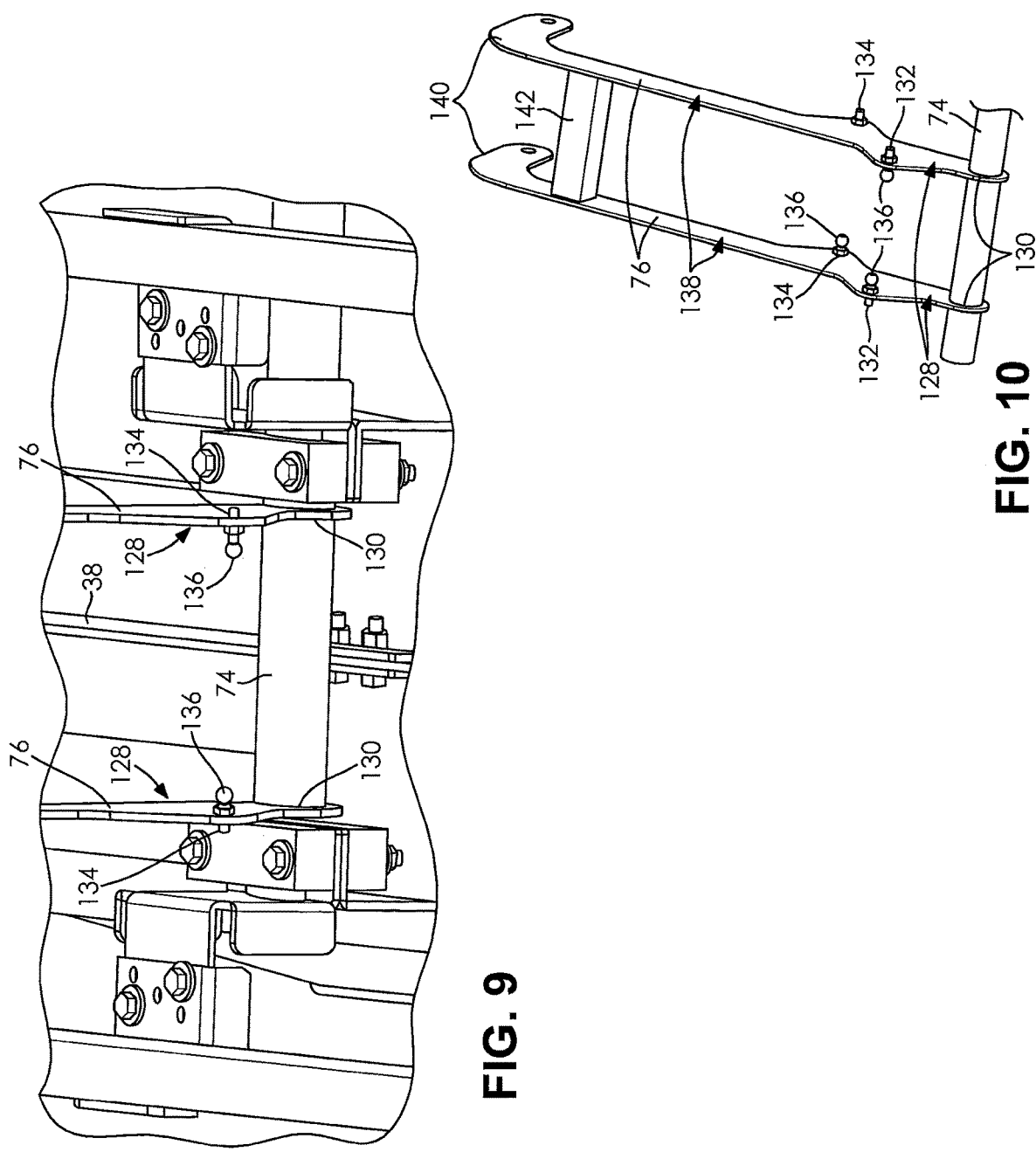

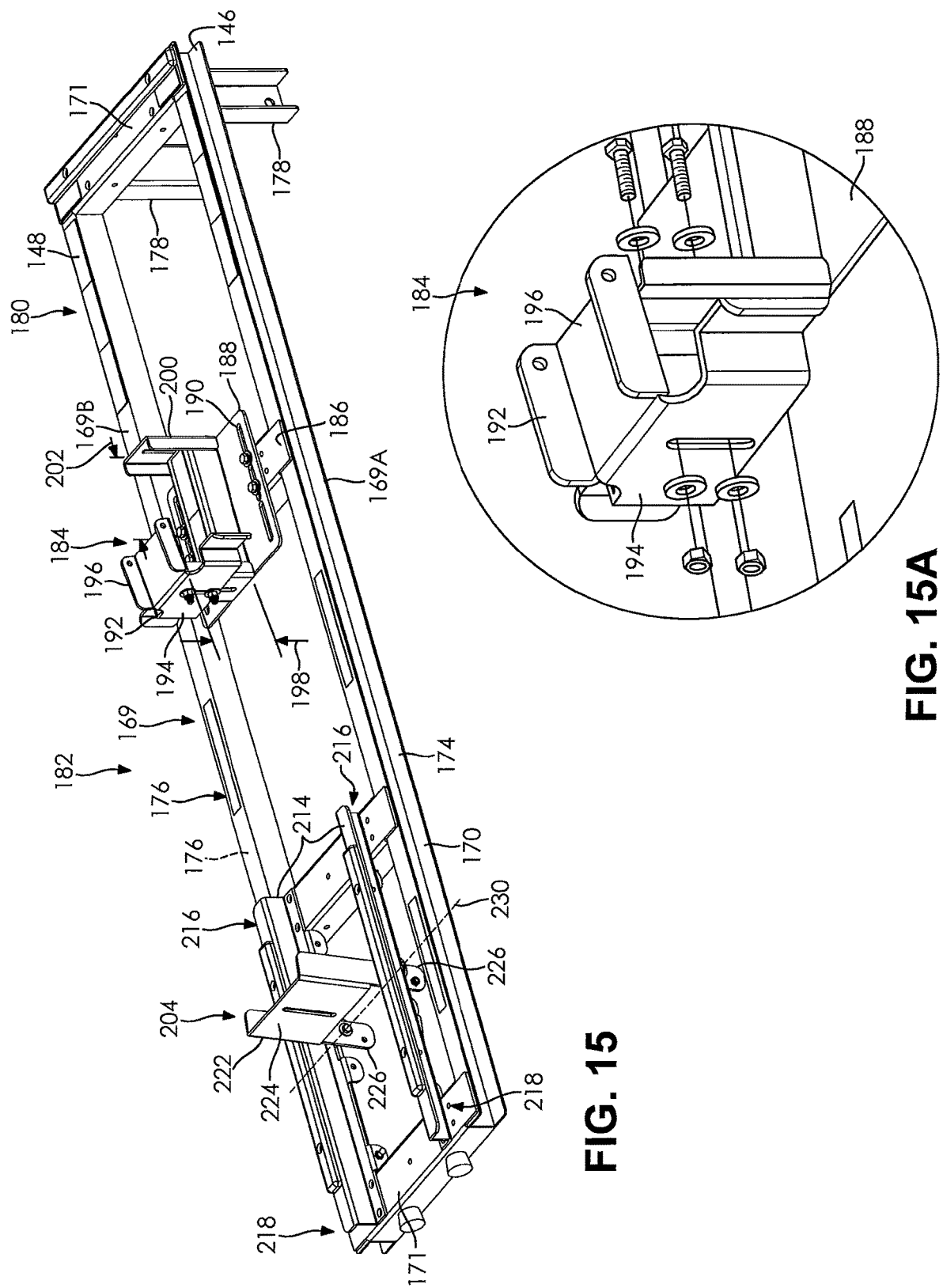

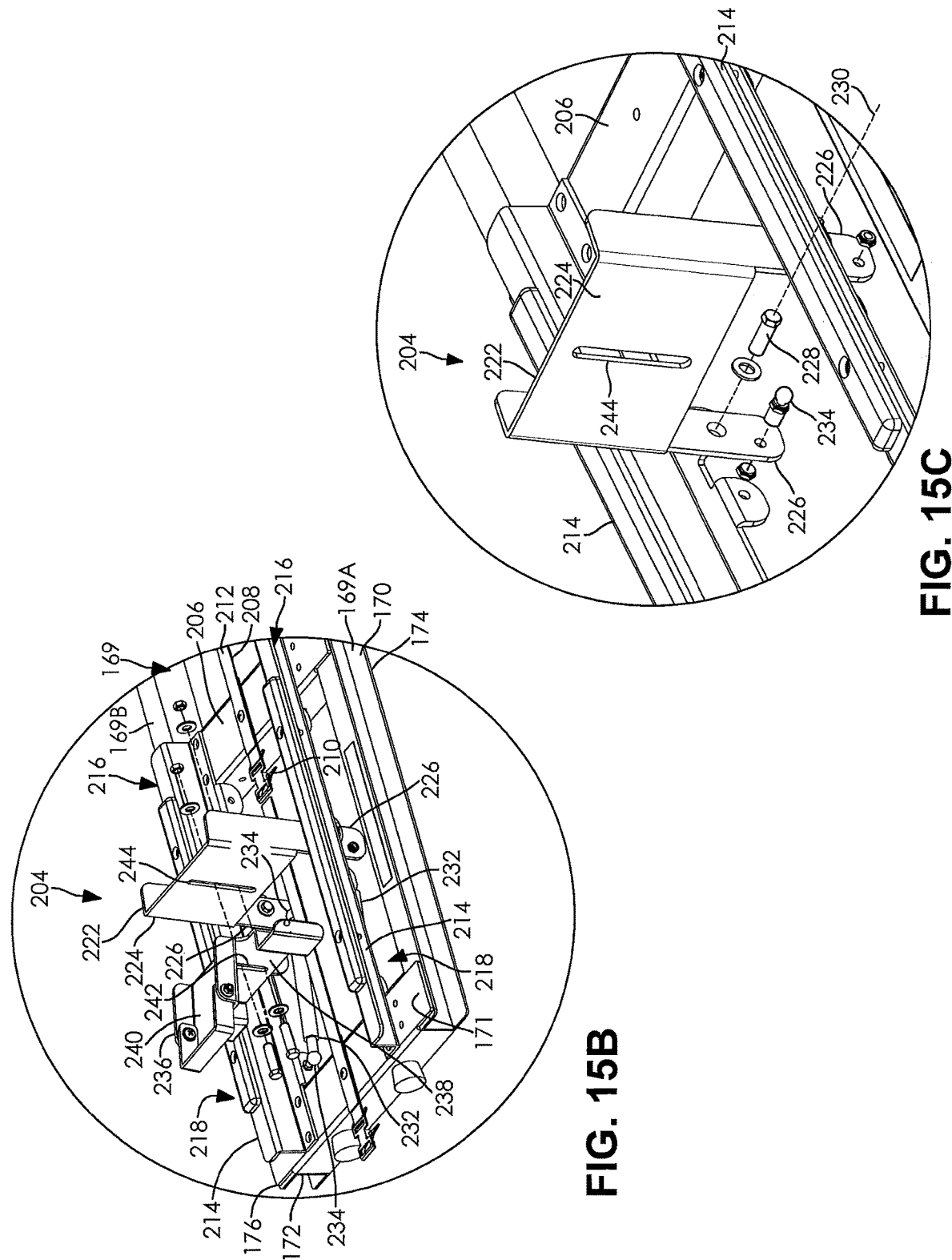

REAR LOADING, DROP DOWN LADDER RACK SYSTEM AND METHOD OF USE

FIELD

The device depicted and described herein relates to roof mounted rack systems for vehicles. More particularly, disclosed is a rear loading, drop down ladder rack system and a method of using the system.

BACKGROUND

It is well-known that vehicles can be used to transport items. Often, these items are not particularly suited for traveling within the passenger or cargo compartments of the vehicle. This may be for a variety of reasons including, but not limited to, it is easier to access them from outside the vehicle, they may be too large to easily access and/or store within the vehicle and/or a variety of other reasons.

As a result, certain items are best stored/transported on the exterior of the vehicle. Various devices have been developed to assist in the storage and transportation of these items on the exterior of the vehicle. Some of these devices, however, don't work very well, they are heavy, they are expensive and/or they are not well made resulting in the devices, the vehicles or the items they are transporting, becoming damaged or breaking. More seriously, people using the devices may be injured.

SUMMARY

One embodiment of a ladder rack system and method of use are described. The system may have a ladder rack frame with an inner rail and an outer rail. The system may also have a ladder rack bed that is selectively moveable with respect to the ladder rack frame. The ladder rack bed may have an inner beam and an outer beam. The system may also have a driveshaft and at least one driveline arm that are connected together. The driveline arm is also connected to the ladder rack bed.

BRIEF DESCRIPTION OF THE DRAWINGS

The above, as well as other advantages, will become readily apparent to those skilled in the art from the following detailed description when considered in the light of the accompanying drawings in which:

FIG. 1 depicts one embodiment of passenger side, rear perspective view of a ladder rack system and a vehicle the system may be used with;

FIG. 3 depicts a top perspective view of one embodiment of a leveling bracket;

FIG. 4A depicts a top perspective view of one embodiment of two dampener brackets;

FIG. 4B depicts a detail from FIG. 4A of one of the brackets;

FIG. 4C depicts a detail from FIG. 4A of another of the brackets;

FIG. 5 depicts a rear perspective view of one embodiment of a driveline system;

FIG. 6 depicts a rear perspective view of one embodiment of an end of a drive shaft;

FIG. 7 depicts a rear perspective view of one embodiment of a handle for the ladder rack system in a stowed orientation;

FIG. 7A depicts the system of FIG. 7 in a deployed orientation;

FIG. 9 depicts a rear perspective view of a portion of one embodiment of the driveline system;

FIG. 10 depicts a rear perspective view of one embodiment of the driveshaft and the drive arms of the system;

FIG. 15 depicts a perspective view of one embodiment of a ladder rack bed;

FIG. 15A depicts a detail from FIG. 15;

FIG. 15B depicts another detail from FIG. 15;

FIG. 15C depicts another detail from FIG. 15;

DETAILED DESCRIPTION OF THE PREFERRED EMBODIMENTS

It is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts described herein. Hence, specific dimensions, directions or other physical characteristics relating to the embodiments disclosed are not to be considered as limiting, unless expressly stated otherwise.

Figure 1:
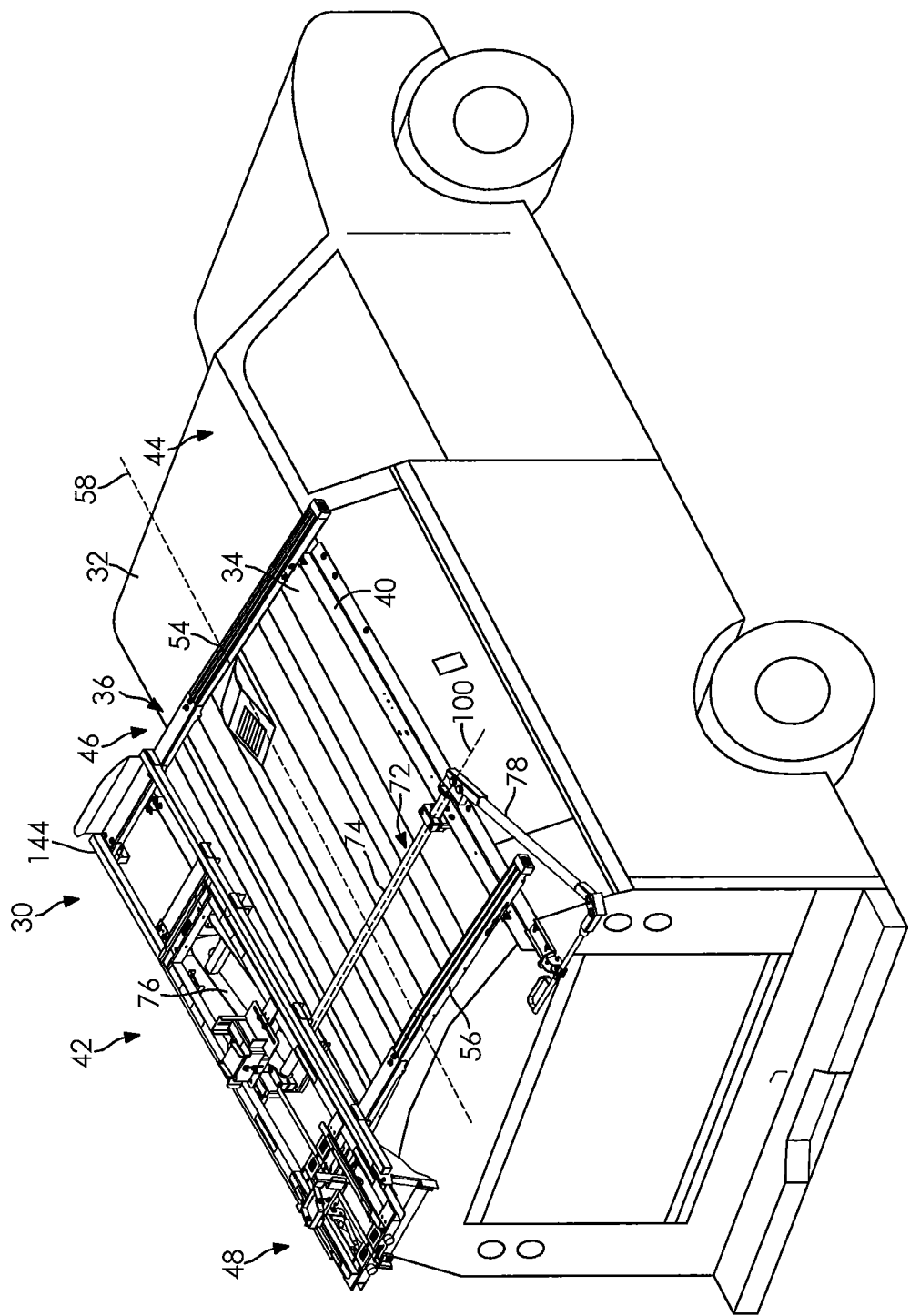
Figure 2:
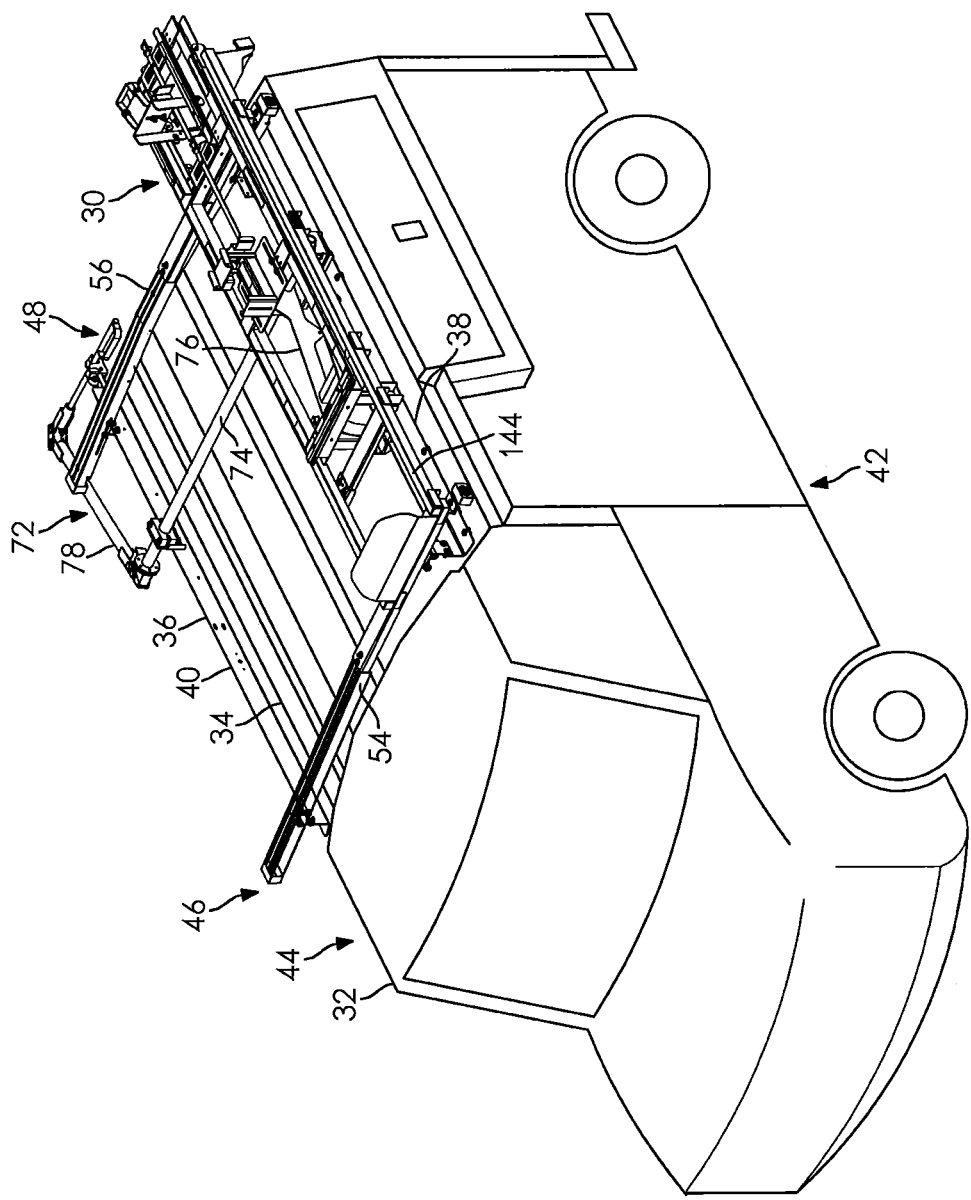
FIG. 2 depicts the system and vehicle of FIG. 1 from a driver's side, rear perspective view.

Turning now to FIGS. 1 and 2, one embodiment of a ladder rack system 30 is depicted. The ladder rack system 30 is adapted to be used with a vehicle 32, such as a cargo van or other related utility or work vehicle 32. The system 30 is adapted to be located on the roof 34 of the vehicle 32.

The ladder rack system 30 may be coupled to a roof rack system 36. One embodiment of a roof rack system 36 is described and depicted in the FIGS. 1 and 2. The ladder rack system 30, however, is not limited for use with just the roof rack system 36 described and depicted herein. Instead, it can be readily appreciated that the ladder rack system 30 can be used with a wide variety of roof rack systems 36 and vehicles 32.

In the depicted embodiment, the roof rack system 36 may be comprised of a first side member 38 and a second side member 40. The first side member 38 may be located on the roof 34 of the vehicle 32 proximate the driver's side 42, also known as the road side, of the vehicle 32. The second side member 40 may also be located on the roof 34 of the vehicle 32 but proximate the passenger's side 44, also known as the curb side, of the vehicle 32.

The terms driver's side, road side, passenger's side and curb side, as shown in the figures, are relative to vehicle orientations as used in the United States. The roof rack system 36 and the ladder rack system 30, however, can be readily adapted for use with vehicles outside of the U.S. that may have opposite, or different orientations, than described and depicted herein.

The vehicle also has a front area 46 and a rear area 48. The front area 46 may be such as the general area where the vehicle power plant and/or operator are located. The rear area 48 may be such as the general area behind the front area 46. It may be comprised of a passenger compartment and/or a cargo area.

The first and second side members 38, 40 may be such as one piece, unitary and integrally formed L-brackets that extend at least a portion of the length of the vehicle 32. The roof rack system 36 as used with the ladder rack system 30, however, is not limited to just these brackets. Instead, each bracket may be comprised of multiple pieces that may or may not extend the length of the vehicle 32 collectively or individually.

As shown in one embodiment in FIG. 3, a lower leg 50 of one of the side members 38 or 40 may be directly secured to the vehicle roof 34 or a structure attached to the vehicle roof 34, such as with mechanical fasteners. The other side member may be similarly attached to the roof 34. An upper leg 52 of each side member 38, 40 may be used as a connection point for a roof rack system forward member 54 and a roof rack system rear member 56.

As shown in FIGS. 1 and 2, the forward and rear members 54, 56 are spaced apart from one another generally. The forward member 54 may be located adjacent the forward area 46 of the vehicle 32, while the rear member 56 may be located adjacent the rear area 48 of the vehicle 32, such as adjacent the cargo compartment. The forward and rear members 54, 56 may be connected to the first and second side members 38, 40 by mechanical fasteners.

In certain vehicles, the roof 34 may be curved. In one example, the vehicle 32 may have a generally higher point along a centerline 58 of the vehicle 32 and the roof 34 may slope equally down and away from the centerline 58.

In the case where the roof 34 is sloped, the side members 38, 40 and/or the forward and rear members 54, 56 may be designed to accommodate the roof 34 slope. In the depicted embodiment, however, leveling brackets 60 may be added to the passenger and driver side of each forward and rear member 54, 56 to accommodate the roof 34 slope. One example of a leveling bracket 60 is shown in FIG. 3, where the bracket 60 is attached with mechanical fasteners to the forward member 54. The leveling brackets 60 accommodate the slope of the vehicle roof 34 by being mounted lower on the forward/rear members 54, 56 near the centerline 58 of the vehicle 32 and being mounted higher on the forward/rear members 54, 56 adjacent the first and second side members 38, 40.

The figures depict just one embodiment of the leveling brackets 60 and other leveling brackets 60 with more or less angle than those shown may be used to accommodate any roof 34 curvature. Of course, in some cases no leveling brackets 60 are needed if the side members 38, 40 or forward or rear members 54, 56 accommodate the roof 34 curvature and/or if there is no curvature that needs to be accounted for.

As shown in FIG. 4A, dampener brackets are mounted on the first side member 38. A forward dampener bracket 62 and rear dampener bracket 64 are spaced apart from one other along the length of the vehicle 32 and attached to the first side member 38. Preferably, the dampener brackets 62, 64 are attached to the upper leg 52 of the first side member 38 such as with mechanical fasteners. The rear dampener bracket 64 may be located adjacent the rear member 56. The forward dampener 62 bracket is located forward of the rear member 56.

FIG. 4B depicts one embodiment wherein the forward dampener bracket 62 is comprised of two pieces that sandwich the upper leg 52 of the first side member 38 between them. Mechanical fasteners extend through the two pieces and the upper leg 52 to secure the pieces and upper leg 52 together. The two pieces form a cradle. The rear dampener bracket 64 may be formed in a similar manner. Thus, a forward 66 and a rear 68 cradle are formed on the first side member 38. In addition, ball studs 70 are mounted to each dampener bracket 62, 64, as shown in FIG. 4C.

In one embodiment, a driveline system 72 for the ladder rack system 30 may be connected to the roof rack system 36. The driveline system 72 may comprise brackets for attaching the driveline system 72 to the first and second side members 38, 40, a driveshaft 74, at least one driveline arm 76, and at least one handle rod 78.

The above-described embodiment is depicted in FIGS. 1, 2 and 5 wherein a street side (or driver's side) bracket system 80 connects the driveline system 72 to the first side member 38. FIG. 5 depicts an inner bracket 82 and an outer bracket 84 sandwiching the first side member 38. Mechanical fasteners may extend through the inner and outer brackets 82, 84 and the first side member 38 to lock them together.

The inner and outer brackets 82, 84 support inner and outer bushings 86, 88, where the bushings 86, 88 are connected to inside portions of the brackets 82, 84. The inner bushing 86 is comprised of an upper bushing 90 and a lower bushing 92. The outer bushing 88 is comprised of an upper bushing 94 and a lower bushing 96.

The bushings 86, 88 rotatably support the driveshaft 74. More particularly, a street side portion 98 of the driveshaft 74 is located between the upper and lower bushings 90, 92, 94, 96 of both the inner and outer bushings 86, 88. The bushings 86, 88 permit selective relative rotation of the driveshaft 74 with respect to the stationary bushings 86, 88 and the street side bracket system 80.

As shown in FIGS. 1, 2, 5, 6 and 7 the driveshaft 74 may be such as a tubular member. The driveshaft 74 may be one piece or it may be comprised of a plurality of pieces. Preferably, the driveshaft 74 extends along a continuous, single axis 100 from the driver's side 42 to the passenger side 44 of the vehicle 32. The axis 100 is parallel with the forward and rear members 54, 56. The axis 100 may or may not be co-planar with the forward or rear member 54, 56. The axis 100 is transverse the longitudinal centerline 58.

Adjacent the curb side 44 of the vehicle 32, a curb side bracket system 102 connects the driveshaft 74 with the second side member 40. As shown in FIG. 7, the curb side bracket system 102 comprises an upper and lower bushing 104, 106 through which the driveshaft 74 is located. The upper and lower bushings 104, 106 support selective rotation of a curbside portion 108 of the driveshaft 74 with respect to the stationary bushings 104, 106.

The curb side bracket system 102 includes bushing mounts 110 to which the bushings 104, 106 are secured such as through mechanical fasteners. The bushing mounts 110 are secured to the second side member 40 with mechanical fasteners.

The curb side portion 108 of the driveshaft 74 may have a mounting flange 112. In the embodiment depicted in FIG. 7, the mounting flange 112 may be such as a circular flange connected for rotation with the driveshaft 74. While a circular flange is depicted, other shapes and sizes are permissible.

A first handle rod 114 may be connected to the mounting flange 112 with a complementary shaped mounting flange 116. Mechanical fasteners may extend through the two flanges 112, 116 to rotationally lock them together.

The first handle rod mounting flange 116 may have or be connected to, an angled piece 118 that angles the first handle rod 114 away from the driveshaft axis 100 in a non-transverse fashion. The angled piece 118 may locate the first handle rod 114, which may be such as a tube with a single longitudinal axis, in an orientation that it is not located parallel the second side member 40. Instead, the first handle rod 114 extends outwardly from the mounting flange 112 from a first end portion 120 to a second end portion 122 of the first handle rod 114, as shown in FIG. 7.

The second end portion 122 of the first handle rod 114 may be connected to a second handle rod 124, as show in FIG. 7. The connection between the two handle rods 114, 124 may be such as a pivotal connection. In one embodiment, the second handle rod 124 may pivot with respect to the first handle rod 114 such that the first handle rod 114 can be selectively axially aligned with the second handle rod 124, as shown in FIG. 7A. The pivot action may be achieved by hinges and/or pins that permit the two rods 114, 124 to move with respect to one another.

The second handle rod 124 functions to effectively increase the mechanical advantage of the first handle rod 114 by increasing the length of the first handle rod 114. When the second handle rod 114 is not in use, it may be selectively secured to the vehicle 32 such as with a clasp 126. In the stowed condition, the second handle rod 124 may be located substantially parallel the rear member 56, as shown in FIG. 7.

Figure 8:
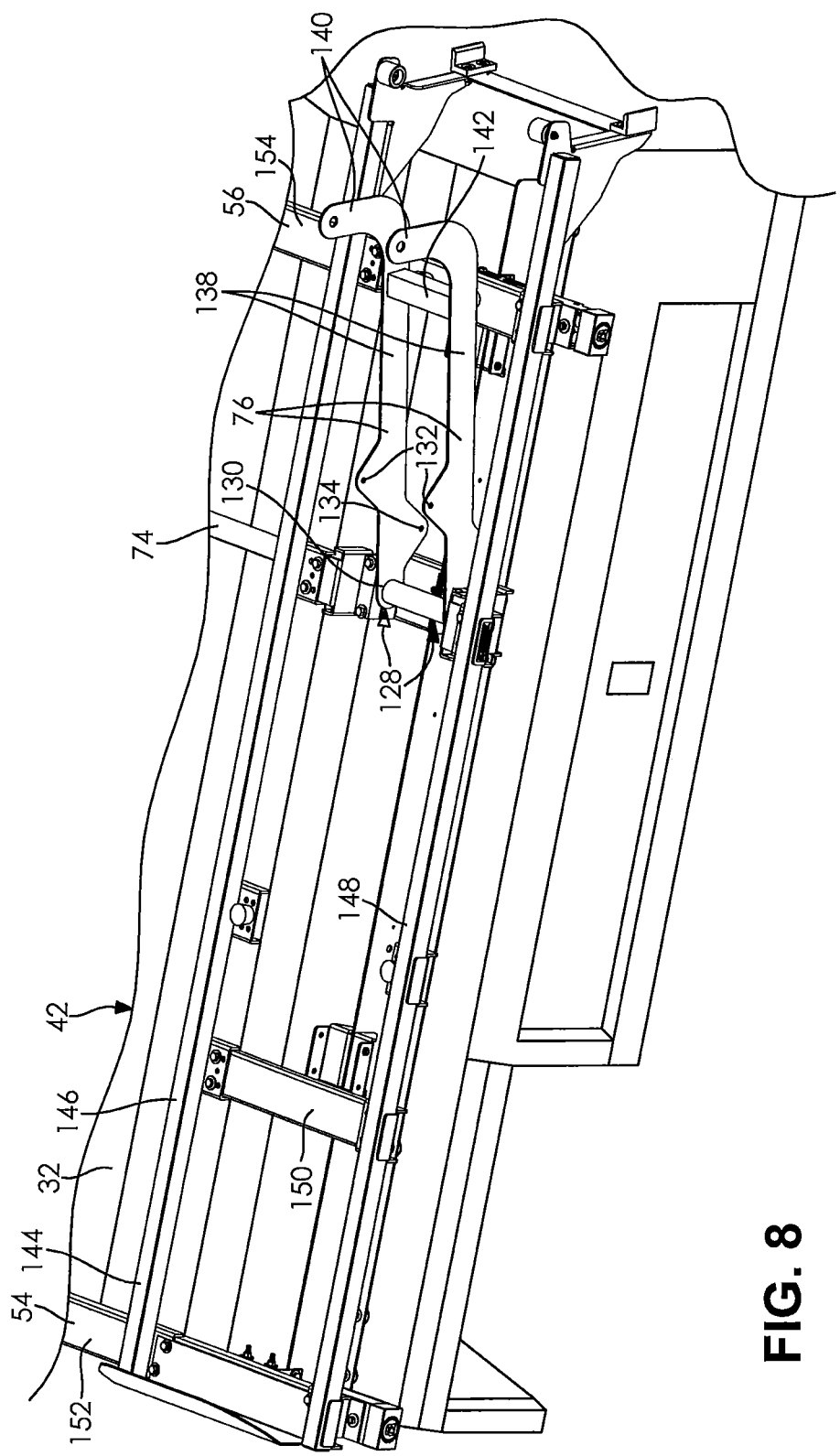
FIG. 8 depicts an upper perspective view of a portion of one embodiment of a ladder rack bed, the driveshaft and the drive arms of the system.

FIGS. 8, 9 and 10 depict at least one driveline arm 76 connected to the driveshaft 74 adjacent the driver's side 42 of the vehicle 32. Preferably, inner end portions 128 of each of two driveline arms 76 are fixedly connected to the driveshaft 74. The driveshaft 74 extends through apertures 130 in the inner end portions 128 of both arms 76. The driveshaft 74 may be connected to the arms 76 such as by welding and/or mechanical fasteners.

The arms 76 may have the same shape and size as one another. Each arm 76 may be unitary, one piece and integrally formed (such as, for example, from stamped or cut steel), or they may be comprised of pieces. Adjacent the inner end portions 128, the arms 76 may each have upper and lower ball stud mounts 132, 134. Balls studs 136 may be selectively located in the mounts 132, 134.

A body portion 138 is located between the ball stud mounts 132, 134 and an outer end portion 140 of each driveline arm 76. The body portion 138 may have a rectangular cross section of constant width and height along the length of the body portion 138.

The outer end portions 140 of each driveline arm 76 are directed in a transverse direction from the body portions 138. The outer end positions 140 are co-planar with the body positions 138. As shown in FIG. 10, the outer end portions 140 of both driveline arms 76 extend in the same direction, and are parallel one another. A separator bar 142 is located between the body portions 138 and/or the outer end portions 140 to add structural rigidity to the driveline arms 76 and cause them to work together as one device. In one embodiment, shown in FIGS. 8 and 9 the driveline arms 76 are located on either side of the first side member 38.

The ladder rack system 30 may be comprised of a ladder rack frame 144, an embodiment of which is shown in FIGS. 1, 2, 8, and 11. The ladder rack frame 144 may be comprised of two rails, which may be an inner rail 146 and an outer rail 148. The rails 146, 148 may be such as metal bars with substantially rectangular or square cross sections. The rails 146, 148 may be substantially the same as one another in their shape and size. In the depicted embodiment, the rails 146, 148 are co-planar and parallel one another. They may also be parallel with the first and second side members 38, 40, the rails 146, 148 are not co-planar with the first and second side members 38, 40. Preferably, the driveline arms 76 are located between the inner and outer rails 146, 148.

At least one cross piece 150 may be located between the inner and outer rails 146, 148, such as with mechanical fasteners. The cross piece 150 links the rails 146,148 together and adds strength and rigidity to the ladder rack frame 144.

As shown in FIGS. 1, 2 and 8 the rails 146, 148 are secured to the forward and rear members 54, 56. For example, the rails 146, 148 may be secured directly to upper surfaces 152, 154 of the forward and rear members 54, 56 such as with mechanical fasteners. In this orientation, the rails 146, 148 are located equidistance from one another and are parallel and coplanar.

Figure 11:
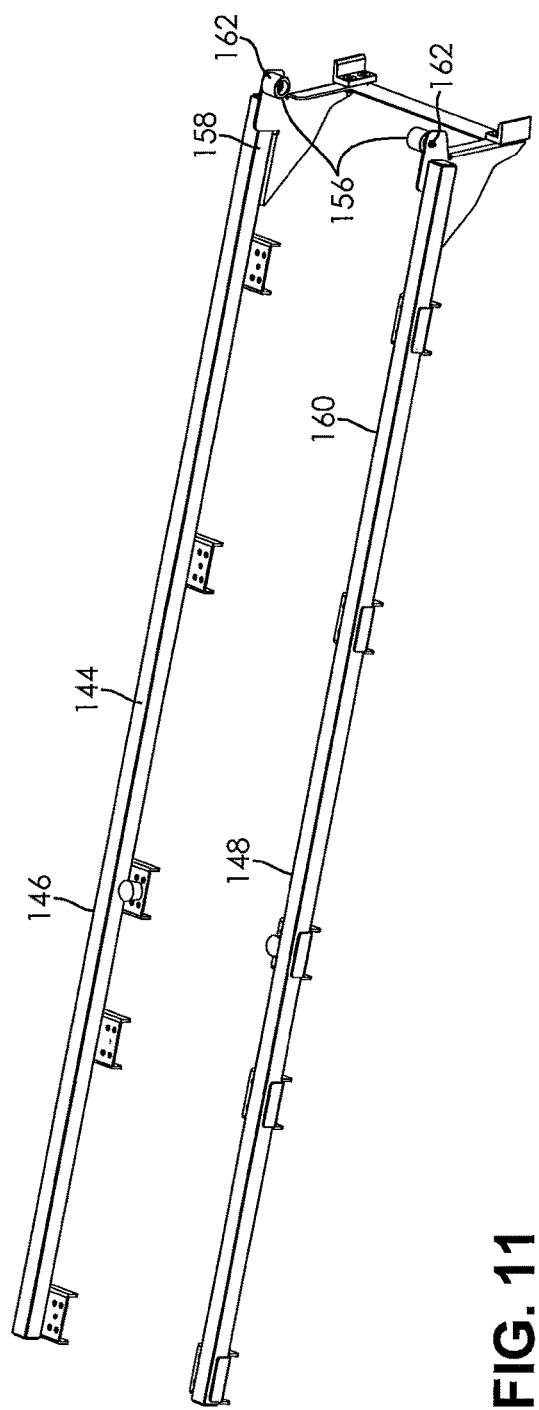
FIG. 11 depicts an upper perspective view of one embodiment of a ladder rack frame.

Each rail 146, 148 may be provided with a roller 156 on an end portion of each rail 146, 148. As shown in FIG. 11, a roller 156 is located on an inside surface 158, 160 of each rail 146, 148. It can be appreciated from FIG. 8 that the roller 156 is located longitudinally beyond the rear member 56. The rollers 156 are located directly across from one another and are parallel and co-planar with one another. The rollers 156 are mounted on a pin 162 secured to the rail 146, 148; the pin 162 permits the roller 156 to rotate about the pin 162 but the roller 156 cannot otherwise move with respect to the rail 146, 148.

Figure 12:
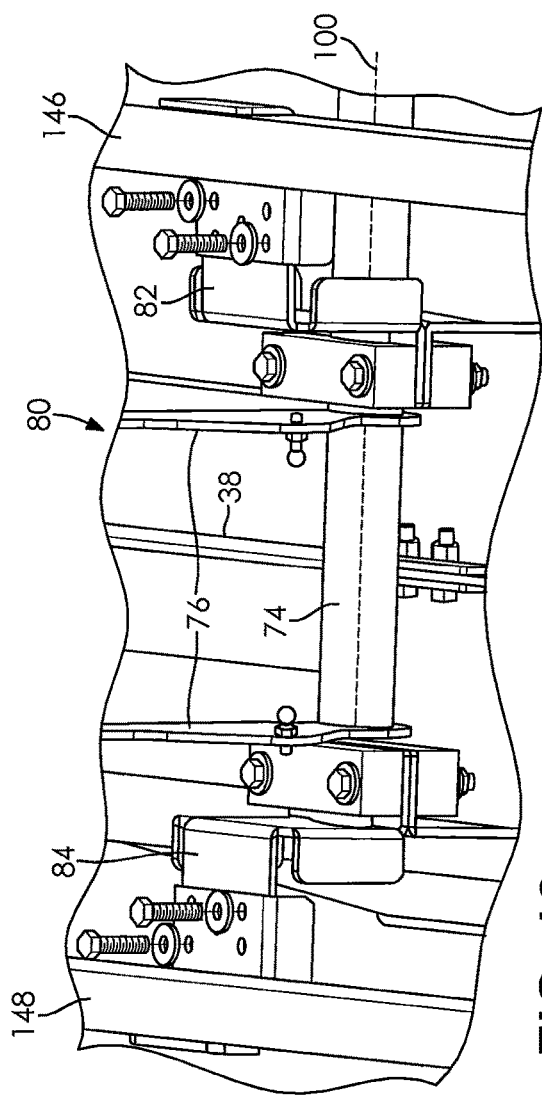
FIG. 12 depicts a rear perspective view of a portion of one embodiment of the driveline system.

The inner and outer brackets 82, 84 of the street side bracket system 80 are connected to each rail 146, 148 as shown in FIGS. 8, 9 and 12. More particularly, the inner bracket 82 is connected to the inner rail 146 with mechanical fasteners and the outer bracket 84 is connected to the outer rail 148 with mechanical fasteners.

From FIGS. 8, 9 and 12 it can be appreciated that, the rotational axis 100 of the driveshaft 74 is located below the rails 146, 148. The rotational axis 100 is located parallel the forward and rear members 54, 56 which can be appreciated from FIGS. 1 and 2.

Figure 13:
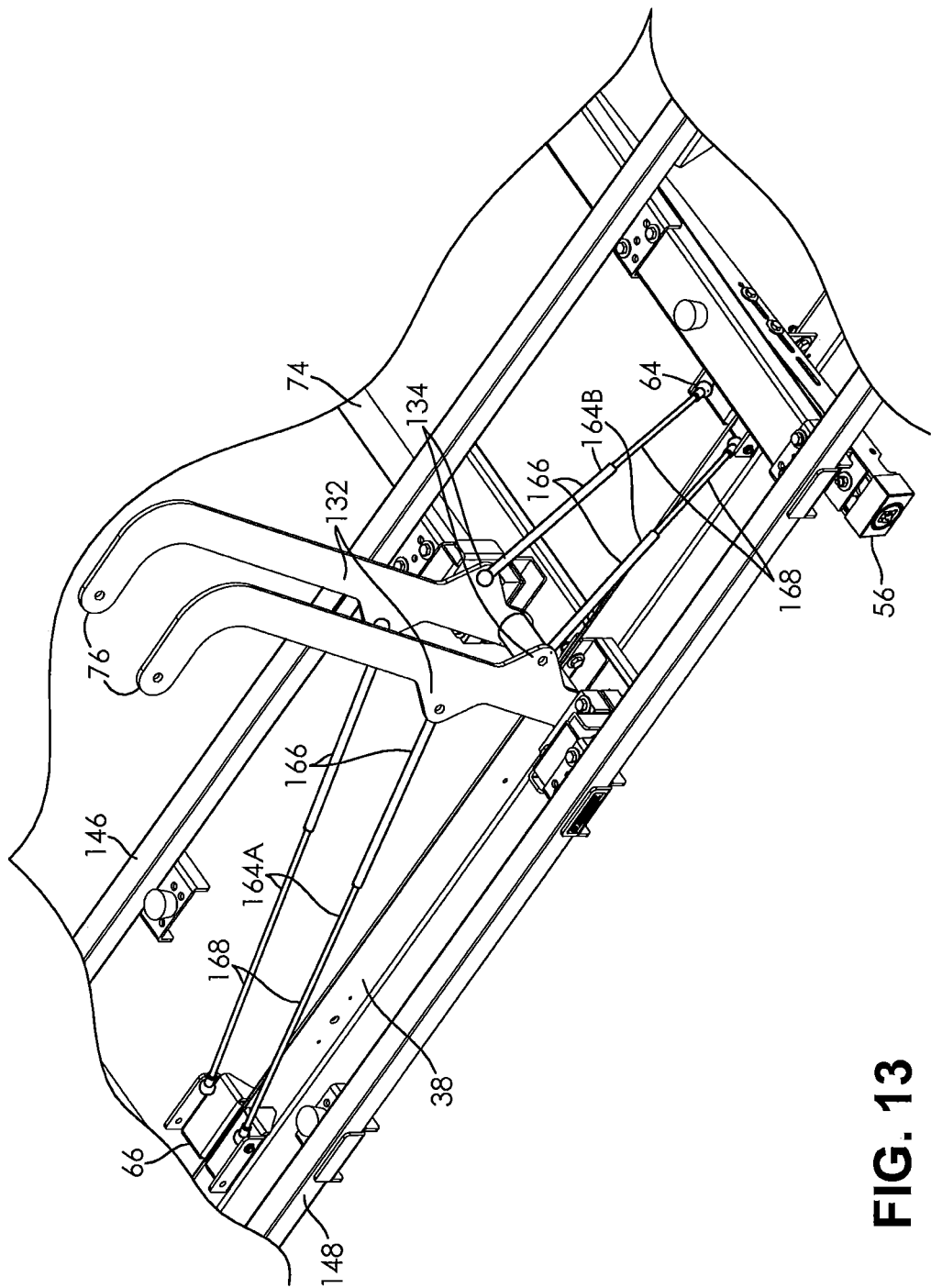
FIG. 13 depicts a perspective view of one embodiment of the driveline arms and the dampening devices.
Figure 14:
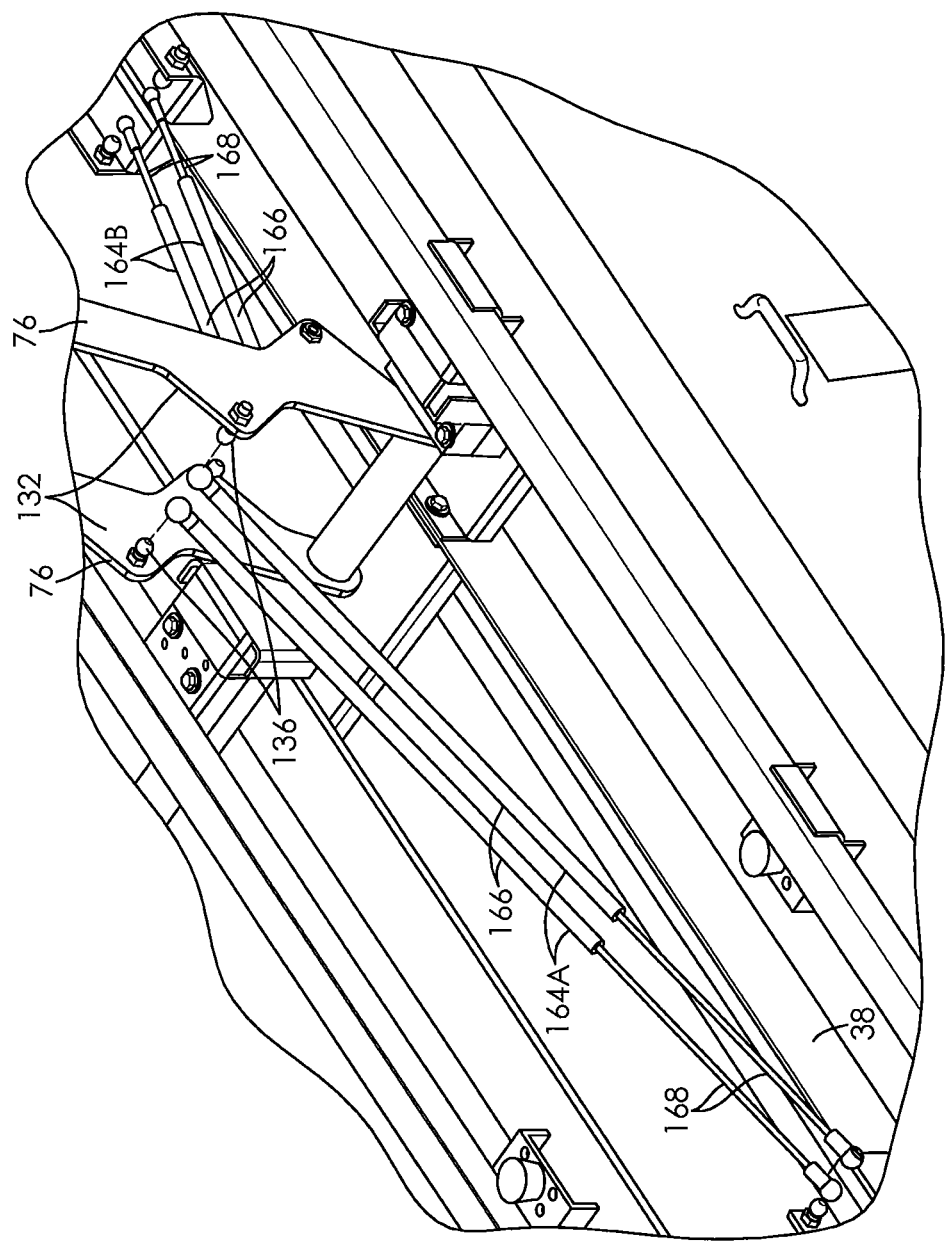
FIG. 14 depicts a perspective view of a detail of FIG. 13.

Turning now to FIGS. 13 and 14, one embodiment of a dampening device connected between the first side member 38 and the driveline arm 76 is depicted. In the depicted embodiment, four dampening devices 164A, 164B connect the two driveline arms 76 with the first side member 38. More particularly, two dampening devices 164A connect with the upper ball stud mounts 132 on a forward portion of each driveline arm 76 with the first side member 38, and two dampening devices 164B connect with the lower ball stud mounts 134 on a rear portion of each driveline arm 76 with the first side member 38. As shown in FIG. 14, two dampening devices 164A may be connected to the upper ball stud mount 132 of each driveline arm 76. These two dampening devices 164A extend toward the forward member 54 where they connect with the first side member 38 via ball studs 136. And, two dampening devices 164B may be connected to the lower ball stud mount 134 of each driveline arm 76, as best seen in FIG. 13. These two dampening devices 164B extend toward the rear member 56 where they connect with the first side member 38 via ball studs 136.

Connecting both ends of each dampening device 164A, 164B to ball studs 136 permits the connecting end of each dampening device 164A, 164B to rotate and pivot about each ball stud 136 as the ladder rack bed 169 (described below) and the driveline arms 76 move as described below.

Each dampening device 164A, 164B may be comprised of a fluid filled cylinder 166 with one end of a rod/piston 168 extending therein. The fluid within the cylinder 166 slows the selective movement (either into or out) of the rod/piston 168 within the cylinder 166. The fluid may be such as a liquid and/or a gas. The use of two sets of dampening devices 164A, 164B connected to the driveline arms 76 controls, and effectively slows, the selective forward and rear movement of the driveline arms 76.

Turning now to FIGS. 1, 2 and 15, a ladder rack bed 169 is depicted. The bed 169 is comprised of an inner beam 169A and an outer beam 169B. The beams 169A, 169B are co-planar and parallel. They may be the same shape and size as one another. The beams 169A, 169B may be connected together at their end portions, such as with the cross pieces 171. The beams 169A, 169B and the cross pieces 171 form a ladder rack bed 169 that is substantially rectangular.

The inner beam and outer beam 169A, 169B preferably define roller channels 170, 172 on an outside surface 174, 176 of each beam 169A, 169B, as shown in FIGS. 15 and 15B. Each roller channel 170, 172 may continuously extend the length of each beam 169A, 169B. The roller channels 170, 172 may be C-shaped with upper and lower walls connected by a middle wall.

Figure 16:
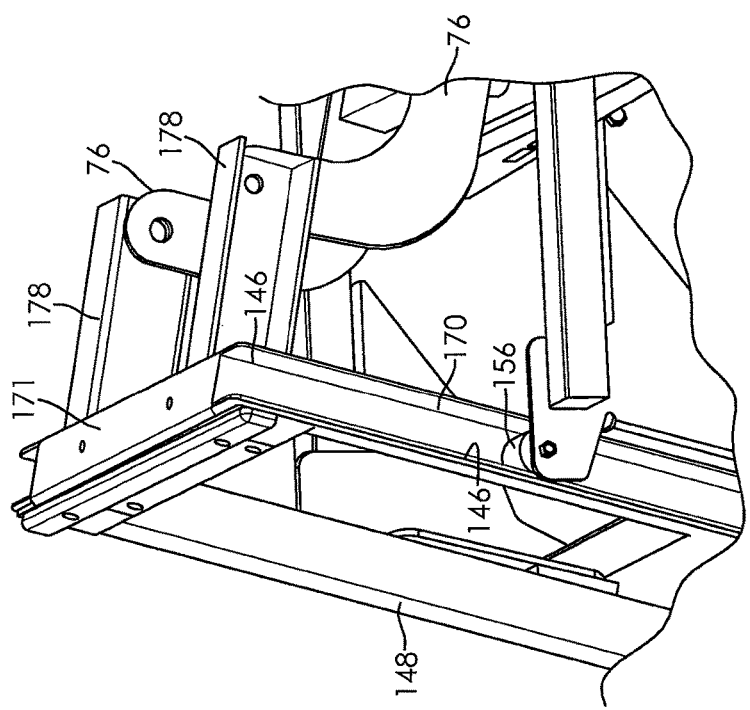
FIG. 16 depicts a side perspective view of a portion of the ladder rack bed in one orientation.

The walls of the roller channels 170, 172 retain the rollers 156 of the beams 169A, 169B and act as guides for the rollers 156. The rollers 156 selectively roll within and along the channels 170, 172, as shown in FIG. 16.

Figure 17:
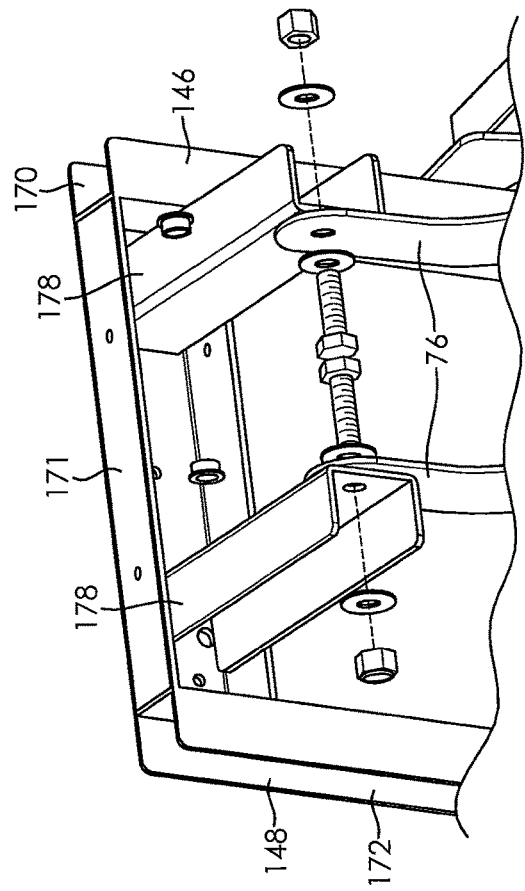
FIG. 17 depicts a front perspective view of another portion of the ladder rack bed.
Figure 18:
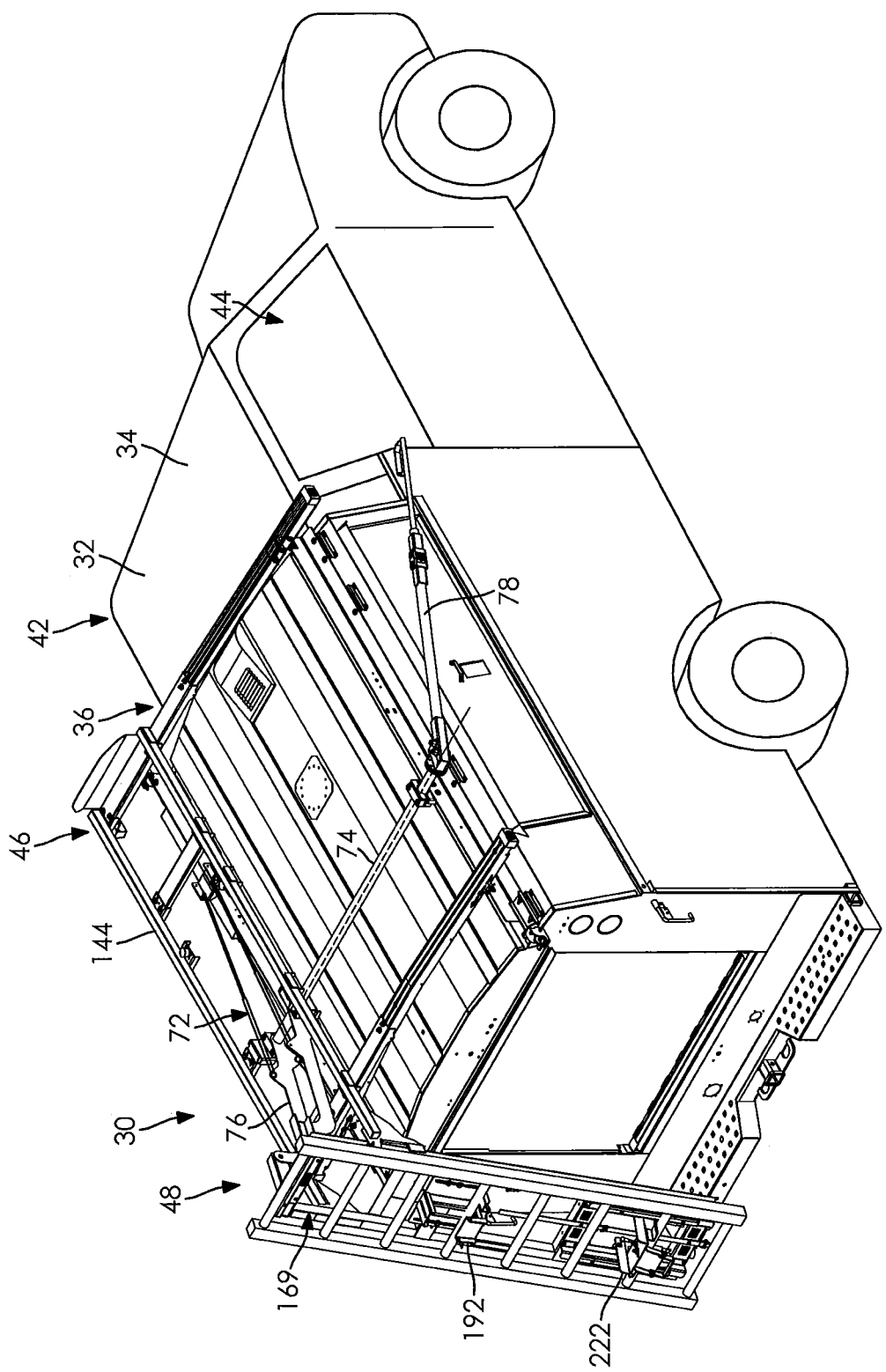
FIG. 18 depicts a rear perspective view of the ladder rack bed in a lowered orientation.

Ladder bed brackets 178 may extend transversely from a forward end portion 180 of the ladder rack bed 169. Preferably, there are two ladder bed brackets 178, and each bracket 178 attaches to one of the driveline arms 76, as shown in FIGS. 17 and 18. The attachment between each bracket 178 and each driveline arm 76 is a secure, pivoting-type connection that permits pivotal movement between the brackets 178 and the arms 76.

The ladder rack bed 169 may also be comprised of a ladder retention system 182. One embodiment of the system 182 is depicted in FIG. 15.

As seen in FIGS. 15 and 15A, the system 182 is comprised of an upper bracket 184. The upper bracket 184 is secured to the inner and outer rails 146, 148 such as with an upper bracket cross member 186. The upper bracket cross member 186 extends transversely between, and connects with, the two rails 146, 148.

An adjustment plate 188 is mounted to the upper bracket cross member 186. The adjustment plate 188 may have vertically oriented fastener slots 190 therein. The slots 190 may accommodate fasteners to secure the plate 188 to the cross member 186. Fasteners may be located anywhere within the slots 190 so as to permit vertical adjustment of the plate 188. Vertical adjustability of the plate 188 accommodates ladders of different sizes and shapes.

The upper bracket 184 may be comprised of an upper ladder rung retention member 192. The member 192 may be L-shaped where the lower leg 194 of the L is attached to the adjustment plate 188 and the upper leg 196 of the L extends transverse the lower leg 194 and is also parallel the adjustment plate 188. The lower leg 194 creates a gap 198 between the adjustment plate 188 and the upper leg 196. The lower leg 194 may be slotted so that a fastener can extend through the slot and into the upper bracket 184 so that the member 192 may be pushed in or out with respect to the plate 188 to accommodate ladders/ladder rungs of various sizes and shapes. A ladder rung may be selectively located in the gap 198 so that it is supported directly on the lower leg 194. The upper leg 196 prevents the ladder rung from sliding off the lower leg 194. Instead, the ladder rung has to be lifted off of, and located on, the lower leg 194.

A top bracket 200, located on an upper portion of the adjustment plate 188, extends parallel the lower leg 194, but it is vertically separated from the lower leg 194. The top bracket 200 and an upper edge of the upper leg 196 provide an entry/exit gap 202 for the ladder rung. The gap 202 is large enough for the ladder rung to be selectively inserted therein, but small enough that it functions to selectively retain the ladder rung within the upper bracket 184.

The system 182 may also be comprised of a lower bracket 204. The lower bracket 204 may have a lower bracket cross member 206. The lower bracket cross member 206 extends transversely between, and connects with, the inner and outer rails 146, 148.

A flexible strap 208 may be attached to the lower bracket cross member 206, as shown in FIG. 15B. The strap 208 may be part of the ladder retention system 182. The strap 208 may have a buckle type attachment 210, or other structures, that selectively create a secure loop. The strap 208 may be located around one or more ladder rungs. The ends 212 of the strap 208 may be secured together with the loop creating structure 210, and the strap 208 may be tightened down on the rung(s) to secure the rung(s) and thus the ladder to the ladder rack bed 169.

As shown in FIGS. 15 and 15B, the lower bracket 204 may be comprised of two side brackets 214 that are spaced apart, but parallel, one another. The two side brackets 214 are also parallel, but spaced apart from, the ladder rack bed inner and outer rails 146, 148. An upper end 216 of each of the two side brackets 214 attach to the lower bracket cross member 206. A lower end 218 of each of the two side brackets 214 attach to the lower cross piece 171.

A lower ladder rung retention member 222 is pivotally attached to each of the side brackets 214. In one embodiment, a base plate 224 of the ladder rung retention member 222 has two attachment ears 226 through which pins 228 extend and into the side brackets 214, as shown in FIG. 15C. The pins 228 support pivotal movement of the base plate 224 about a single, fixed axis 230 with respect to the stationary side brackets 214.

Pivotal motion of the base plate 224 may be controlled by at least one dampening device 232. Preferably, two dampening devices 232 connect the base plate 224 with the side brackets 214. As shown in FIG. 15B, one end of each dampening device 232 is connected to one of the attachment ears 226, such as with a ball stud 234. The other end of each dampening device 232 is connected to the lowermost cross member 220, such as with a ball stud 234. The ball studs 234 permit movement of the dampening devices 232 with respect to the fixed ball studs 234. The dampening devices 232 function to slow the selective raising and lowering of the base plate 224.

A handle portion 236 may be attached to the base plate 224. The handle portion 236 may have an L-shape where a first leg 238 of the L is attached to the base plate 224 and a second leg 240 of the L extends transverse the first leg 238 and the base plate 224. The first leg 238 may have a central slot 242 that is complementary to a slot 244 in the base plate 224. One or more fasteners may be located through the two slots 242, 244 to secure the handle portion 236 to the base plate 224. The slots 242, 244 may be slid with respect to one another and the fastener may be located in the overlapping slots 242, 244 to adjust how close or how far the first leg 238 is with respect to the base plate 224.

It can be appreciated that by sliding the handle portion 236 in or out with respect to the base plate 224, ladders, and more particularly, ladder rungs of different shapes and sizes can be located between the second leg 240, the first leg 238/base plate 224 and the side brackets 214.

The lower ladder rung retention member 222 is movable between a raised position and a lowered position by virtue of the structures recited above. The lowered position locates one or more ladder rungs inboard of the second leg 240, under the first leg 238/base plate 224 and outboard of the side brackets 214. The lowered position secures the ladder to the lower ladder rung retention member 222 and the ladder rack bed 169. In the raised position, the second leg 240 is moved out of the way of the ladder rungs, which lets the ladder be lifted off of the upper ladder rung retention member 192 and removed from the ladder rack bed 169.

The ladder rung retention members 192, 222 of the upper and lower brackets 184, 204 thus securely hold and retain ladder rungs, and thus the ladders, onto the ladder rack bed 169. Ladders can be selectively returned to the ladder rack bed 169 and secured thereto by reversing the steps discussed above.

One embodiment of an operation of the ladder rack system 30 may begin with the ladder rack bed 169 located in a lowered position and a ladder not positioned on the bed 169, as shown in FIG. 18. In the lowered position, the ladder rack bed 169 is readily accessible from the rear area 48 of the vehicle 32 without the need to climb on the vehicle 32 or other structures to reach, or locate, the ladder on the ladder rack bed 169.

Figure 19:
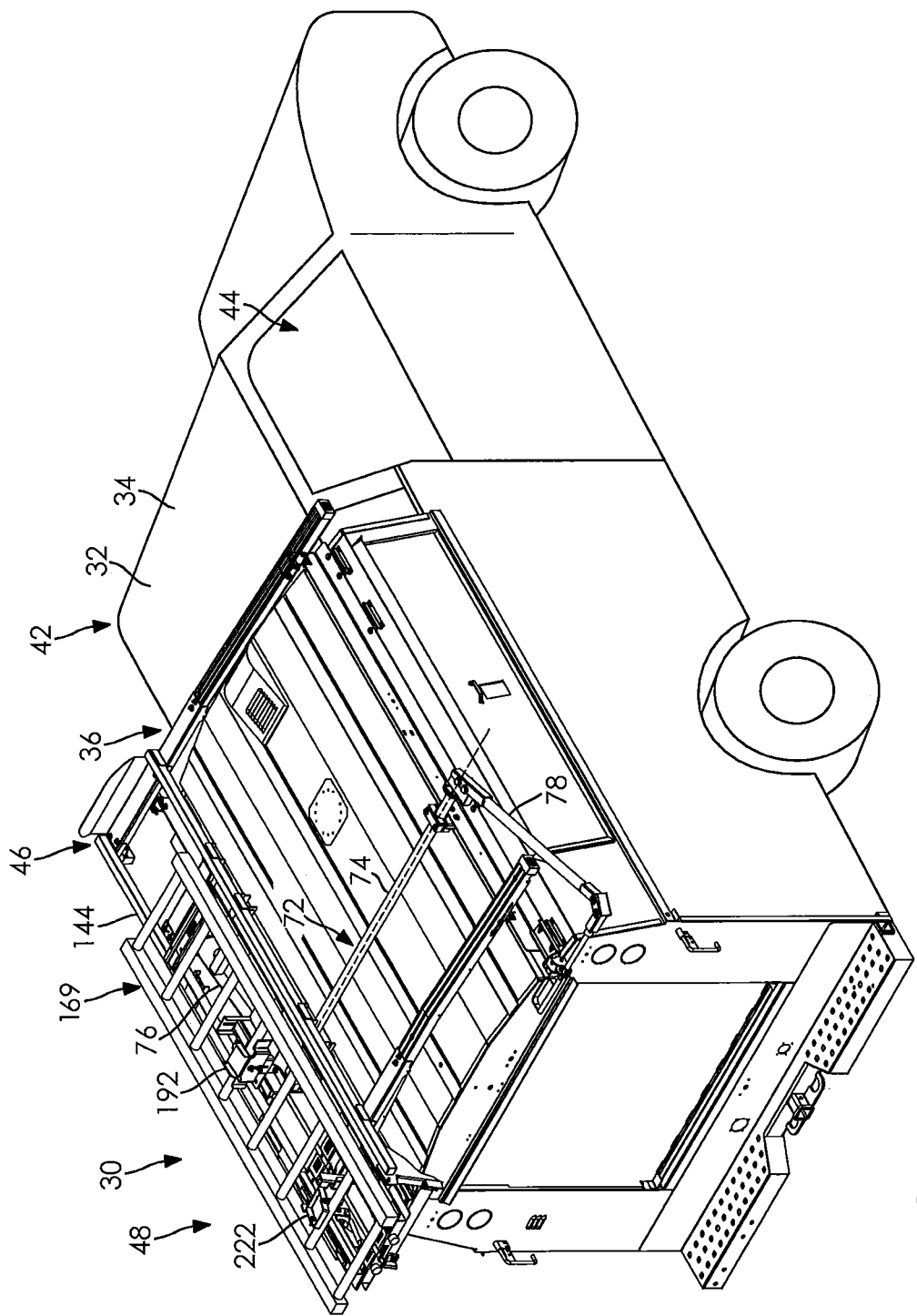
FIG. 19 depicts the ladder rack bed in FIG. 18 with one embodiment of a ladder located thereon.

A ladder may be located on the upper ladder rung retention member 192 where by a ladder rung rests over the lower leg 194 of the L-shaped bracket and the rung is prevented from moving off the lower leg 194 by the upper leg 196 of the L-shaped bracket, as shown in FIG. 19.

The strap 208 may be located over one or more rungs and then the ends 212 of the strap 208 may be secured together so that the strap 208 tightens over the one or more rungs.

In addition, the lower ladder rung retention member 222 is initially located in the raised position so the ladder may be located on the ladder rack bed 169. The lower ladder rung retention member 222 is then moved to the lowered position so that one or more ladder rungs are located inboard of the second leg 240, under the first leg 238/base plate 224 and outboard of the side brackets 214, as shown in FIG. 19. The ladder this now selectively secured to the ladder rack bed 169.

The ladder rack bed 169 may be located from the lowered position to a raised position on the vehicle 32, which is shown in FIGS. 1 and 2. In one embodiment, the second handle rod 124 may be released from the clasp 126. FIG. 1 depicts the second handle rod 124 in the secured position on the vehicle 32 and in the clasp 126. The clasp 126 may be located on the rear area 48 of the vehicle 32 as shown in FIGS. 1 and 7, or it may be located elsewhere on the vehicle 32. Once released, the second handle rod 124 may be articulated about the pin(s) that connect the first and second handle rods 114, 124. Preferably, the second handle rod 124 is rotated until it is axial with the first handle rod 114, as shown in FIG. 7A.

The first and second handle rods 114, 124 may extend in a nonparallel fashion to the passenger side 44 of the vehicle 32, as shown in FIG. 7A. More particularly, the combined rods 114, 124 may diverge from the passenger side 44 of the vehicle 32. The divergence from the passenger side 44 of the vehicle 32 provides clearance between the rods 114, 124 and the passenger side 44. The clearance is helpful as the rods 114, 124 rotate with respect to the passenger side 44.

When the ladder rack bed 169 is in the lowered position, the rods 114, 124 extend toward the front area 46 of the vehicle 32, as shown in FIG. 18.

Figure 20:
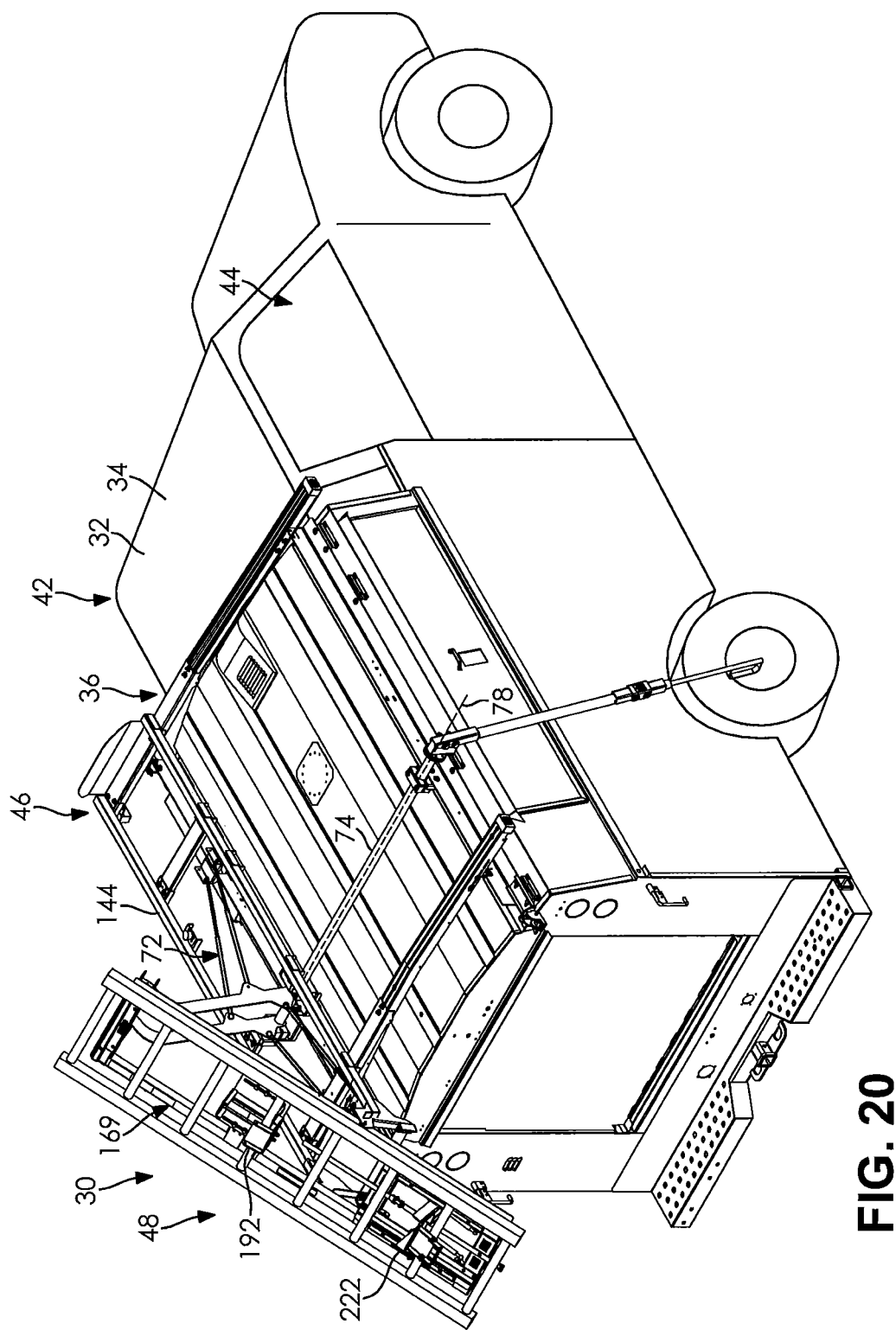
FIG. 20 depicts a perspective side view of one embodiment of a handle rod in a partial orientation and the ladder rack bed in partially raised orientation.

The end of the second handle rod 146 may be grasped and the end may be pushed downwardly and rotated clockwise with respect to the passenger side 44 of the vehicle 32, as shown in FIG. 20. Rotation of the rods 114, 124 rotates the driveshaft 74, also in a clockwise direction. The driveshaft 74, being axially and longitudinally fixed in position on the roof 34, rotates in the bushings 86, 88.

The driveshaft 74 rotates the driveline arms 76. When the ladder rack bed 169 is in the lowered position, the driveline arms 76 are located between the first and second side members 38, 40 of the roof rack system 36 as well as between the inner and outer rails 146, 148 of the ladder rack frame 144, as shown in FIG. 8. The driveline arms 76 may be resting directly on the rear member 56. It can be appreciated that the majority of each driveline arm 76 is located behind the driveshaft 74 in this state. The driveline arms 76 may be located at an upward angle from the driveshaft 74 to their connection with the ladder rack bed 144.

As the driveshaft 74 imparts rotation to the driveline arms 76, the driveline arms 76 rotate with the driveshaft 74 forward with respect to the vehicle 32, as shown in FIG. 20. Since the ladder rack bed 169, and the ladder, are attached to the driveline arms 76, the ladder rack bed 169 moves as well. The rollers 156 of the rails 146, 148 rotate within the side rail channels 170, 172 of the ladder rack bed 169 as the ladder rack bed 169 is raised from the lowered position.

The rods 114, 124 are rotated through approximately 180 degrees. During this rotation the ladder rack bed 169 moves from its lowered position to its raised position on the roof 34 of the vehicle 32. As the ladder rack bed 169 moves from these two positions, the dampening devices 164A attached to the upper ball stud mount 132 of each driveline arm 76 transition from an extended orientation to a compressed orientation such that the pistons 168 are located within the cylinders 166. The dampening devices 164B attached to the lower ball stud mount 134 of each driveline arm 76 transition from an extended orientation to a compressed orientation. The dampening devices 164A, 164B slow the movement of the ladder rack bed 169 onto the ladder rack frame 144 so that the two are not damaged.

When the ladder rack bed 169 is located in the raised position, the majority of the driveline arms 76 are located forward of the driveshaft 74, as shown in FIG. 1. In this condition, the driveline arms 76 may be located under the inner and outer rails 146, 148 to provide a low profile of the ladder rack bed 169 and the ladder on the roof 34.

Once in the raised position, the first and second handle rods 114, 124 are pointed toward the rear area 48 of the vehicle 32, which can be appreciated from FIG. 1. The second handle rod 124 may be pivoted with respect to the first handle rod 114. The pivot may be approximately 90 degrees so that the second handle rod 124 is parallel the rear area 48 of the vehicle 32 while the first handle rod 114 is parallel the passenger's side 44 of the vehicle 32. The second handle rod 124 may be secured to the rear area 48 of the vehicle 32 such as with the clasp 126.

The process may be reversed to lower the ladder rack bed 169 from the roof 34 of the vehicle 32.

What is claimed is:

1. A ladder rack system, comprising:
   a ladder rack frame comprising an inner rail and an outer rail wherein both rails each have a roller on an end portion;
   a ladder rack bed selectively moveable with respect to said ladder rack frame, said ladder rack bed comprising an inner beam and an outer beam, wherein said beams have longitudinal channels in which said rollers move;
   a driveline system comprised of a driveshaft and at least one pivotable driveline arm,
   wherein said at least one pivotable driveline arm is connected at one end portion to a first end portion of said driveshaft for rotation therewith, said at least one pivotable driveline arm is connected at an opposite end portion to said ladder rack bed, and
   wherein said driveline arm is located between said inner and outer rails,
   wherein said driveshaft is located beneath said inner and outer rails;
   wherein said inner and outer rails are connected to an inner bracket and an outer bracket, wherein said inner and outer brackets are located between said inner and outer rails, wherein each bracket supports a bushing that rotatably receives a first end of said driveshaft.

2. The ladder rack system of claim 1, wherein said ladder rack frame inner rail and outer rail are coplanar and parallel.

3. The ladder rack system of claim 1, wherein said ladder rack frame inner rail and outer rail are connected to one another by at least one cross piece.

4. The ladder rack system of claim 1, wherein said rollers are fixed opposite one another on said inner and outer rails.

5. The ladder rack system of claim 1, wherein said driveshaft extends transversely with respect to said inner and outer rails.

6. The ladder rack system of claim 1, wherein said at least one pivotable driveline arm extends transversely with respect to said driveshaft.

7. The ladder rack system of claim 1, wherein said at least one driveline arm has an aperture for receiving said driveshaft therethrough.

8. The ladder rack system of claim 1, wherein two pivotable driveline arms are connected to said driveshaft and spaced apart from one another on the driveshaft.

9. The ladder rack system of claim 1, wherein a second end portion of said driveshaft is connected to a handle rod, said handle rod extending in a non-transverse direction with respect to said driveshaft.

10. A ladder rack system, comprising:
    a ladder rack frame comprising an inner rail and an outer rail;
    a ladder rack bed selectively moveable with respect to said ladder rack frame, said ladder rack bed comprising an inner beam and an outer beam,
    a ladder retention system located on said ladder rack bed comprising an upper ladder rung retention member and a pivotal lower ladder rung retention member,
    wherein said upper ladder rung retention member comprises an L-shaped member with a lower leg and an upper leg,
    wherein said pivotal lower ladder rung retention member comprises a base plate that is pivotally connected to two side brackets, said side brackets extending parallel and connected to said inner beam and said outer beam,
    wherein at least one dampening device connects said side brackets with said base plate, and an L-shaped handle.

11. The ladder rack system of 10, wherein the upper ladder rung retention system is attached to an adjustment plate which is attached to an upper cross bracket connected with the inner and outer beams.

12. The ladder rack system of 10, wherein the lower ladder rung retention system has two dampening devices connected between the side brackets and the base plate.

13. The ladder rack system of claim 10, wherein said lower leg of said upper ladder rung retention member is attached to said adjustment plate.

14. The ladder rack system of claim 13, wherein said lower leg of said upper ladder rung retention member creates a gap between the upper leg and the adjustment plate.

15. The ladder rack system of claim 14, wherein said lower leg is slotted to slide on a fastener.

16. The ladder rack system of claim 10, wherein a top bracket, extending parallel the lower leg, is located on an upper portion of the adjustment plate.

17. The ladder rack system of claim 10, wherein a lower bracket cross member connects the inner and outer rails, said lower ladder retention member connected to the lower bracket cross member.

18. The ladder rack system of claim 10, wherein two side brackets, located parallel one another and the inner and outer rails, are connected to the lower bracket cross member, wherein the lower ladder rung retention member is pivotally attached to the two side brackets.

19. The ladder rack system of claim 18, wherein a base plate of the lower ladder rung retention member has two attachment ears, wherein pins extend through the attachment ears and the two side brackets, the pins support pivotal movement of the base plate about a single, fixed axis.

20. The ladder rack system of claim 19, wherein one end of at least one dampening device is connected to the base plate and the other end is connected to one of the side brackets.

21. The ladder rack system of claim 20, wherein an L-shaped handle portion is attached to the base plate.

22. A ladder rack system, comprising:
    a ladder rack frame comprising an inner rail and an outer rail wherein both rails each have a roller on an end portion;
    a ladder rack bed selectively moveable with respect to said ladder rack frame, said ladder rack bed comprising an inner beam and an outer beam, wherein said beams have longitudinal channels in which said rollers move;
    a driveline system comprised of a driveshaft and at least one pivotable driveline arm,
    wherein said at least one pivotable driveline arm is connected at one end portion to a first end portion of said driveshaft for rotation therewith, said at least one pivotable driveline arm is connected at an opposite end portion to said ladder rack bed, and
    wherein said driveline arm is located between said inner and outer rails,
    wherein said driveshaft is located beneath said inner and outer rails;
    wherein said at least one driveline arm has an upper ball stud mount on one side of the driveline arm and a lower ball stud mount on an opposite side of the driveline arm.

23. The ladder rack system of claim 22, wherein said at least one driveline arm has a body portion located between said ball stud mounts and an outer end portion.

24. The ladder rack system of claim 23, wherein said outer end portion extends transverse to said body portion.

25. The ladder rack system of claim 23, wherein said outer end portion is pivotally connected to said ladder rack bed.

26. The ladder rack system of claim 22, wherein at least one forward dampener is connected to said upper ball stud mount.

27. The ladder rack system of claim 22, wherein at least one rear dampener is connected to said rear ball stud mount.

* * * * *